(12) United States Patent
Kuehne et al.

(10) Patent No.: US 6,811,138 B2
(45) Date of Patent: Nov. 2, 2004

(54) MAGNETIC VALVE FOR CONTROLLING AN INJECTION VALVE OF AN INTERNAL COMBUSTION ENGINE

(75) Inventors: Wolfgang Kuehne, Stuttgart (DE); Rainer Haeberer, Bretten (DE); Matthias Horn, Freiberg (DE); Christoph Ulmschneider, Spaichingen (DE); Andreas Rettich, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/168,043

(22) PCT Filed: Aug. 21, 2001

(86) PCT No.: PCT/DE01/03192

§ 371 (c)(1),
(2), (4) Date: Oct. 18, 2002

(87) PCT Pub. No.: WO02/33246

PCT Pub. Date: Apr. 25, 2002

(65) Prior Publication Data

US 2003/0111625 A1 Jun. 19, 2003

(30) Foreign Application Priority Data

Oct. 18, 2000 (DE) .......................................... 100 51 549

(51) Int. Cl.⁷ .............................................. F02M 59/46
(52) U.S. Cl. ............................. 251/129.19; 251/129.15
(58) Field of Search ........................ 251/129.19, 129.2, 251/129.16, 129.15, 129.01

(56) References Cited

U.S. PATENT DOCUMENTS 3,970,282 A * 7/1976 Hansen .................. 251/129.19
4,917,352 A * 4/1990 Hauet et al. ............ 251/129.19
5,139,224 A * 8/1992 Bright .................... 251/129.16
5,381,999 A * 1/1995 Ricco ..................... 251/129.16
5,396,926 A * 3/1995 Pataki et al. ........... 251/129.16
5,661,895 A * 9/1997 Irgens .................... 251/129.19
5,687,765 A * 11/1997 You ....................... 251/129.19
5,967,413 A * 10/1999 Tian ....................... 251/129.19
6,056,264 A * 5/2000 Benson et al. ......... 251/129.19
6,131,829 A   10/2000 Ricco
6,152,387 A * 11/2000 Ricco ..................... 251/129.16
6,161,813 A * 12/2000 Baumgartner et al. . 251/129.16
6,199,587 B1 * 3/2001 Shlomi et al. ......... 251/129.19
6,279,873 B1 * 8/2001 Eichendorf et al. .... 251/129.19
6,502,804 B1 * 1/2003 Schwegler et al. .... 251/129.16

FOREIGN PATENT DOCUMENTS

DE      196 50 865      6/1998
EP      0 890 731       1/1999

* cited by examiner

Primary Examiner—J. Casimer Jacyna
(74) Attorney, Agent, or Firm—Kenyon & Kenyon

(57) ABSTRACT

A solenoid valve is described, its armature having a part that is slidingly displaceable on the foundation bolt and is movable between two stops of the foundation bolt against the tension force of a restoring spring. When the armature strikes the valve seat of the solenoid valve, the slidingly displaceable part moves further under the influence of its inertial mass on the foundation bolt in the closing direction against the tension force of the restoring spring, until it strikes the second stop of the foundation bolt. The resulting transfer of momentum to the foundation bolt reduces impact of the armature on the valve seat and causes the armature to more quickly reach a defined rest position in which the solenoid valve is closed.

6 Claims, 2 Drawing Sheets

MAGNETIC VALVE FOR CONTROLLING AN INJECTION VALVE OF AN INTERNAL COMBUSTION ENGINE

FIELD OF THE INVENTION

The present invention relates to a solenoid valve for controlling a fuel injector for an internal combustion engine.

BACKGROUND INFORMATION

A solenoid valve is discussed in German Published Patent Application No. 196 50 865 which is used to control the fuel pressure in the control pressure space of a fuel injector, e.g., an injector of a common rail injection system, where the fuel pressure in the control pressure space in turn controls the movement of a valve member, so that an injection opening of the injector may be opened or closed. This solenoid valve has an electromagnet situated in a housing part and having a coil and a magnetic core, a movable armature and a control valve element that is moved with the armature and is acted upon by a closing spring in the closing direction. This control valve element cooperates with a valve seat of the solenoid valve and thus controls the flow of fuel out of the control pressure space. In the case of the solenoid valve discussed in German Published Patent Application No. 196 50 865, the armature is designed in two parts having a foundation bolt and an anchor plate in a slidingly displaceable mount on the foundation bolt. In addition, however, there are solenoid valves for controlling injectors in which the foundation bolt is fixedly connected to the anchor plate.

One disadvantage of the known solenoid valves is armature rebound. When the magnet is shut down, the control valve element, which is secured to the armature, is accelerated suddenly toward the valve seat by the closing spring to close a fuel outflow channel out of the control pressure space. The impact of the control valve element on the valve seat may result in vibration and/or rebound of the control valve element, which is a disadvantage and has a negative impact on the injection operation. In the case of the solenoid valve having a two-part armature, which is discussed in German Published Patent Application No. 196 50 865, rebound is prevented by the fact that the anchor plate is displaceable on the foundation bolt and is moved further against the tension force of a restoring spring in impact of the control valve element on the valve seat. The effectively braked mass thus becomes smaller. However, then it is necessary to prevent post-pulse oscillation of the anchor plate on the foundation bolt, which would be a disadvantage. This is achieved by a hydraulic damping space formed between a sliding sleeve secured on the anchor plate and a sliding piece situated in a stationary mount on the housing part of the solenoid valve, damping any post-pulse oscillation of the anchor plate. In the case of a very strong deflection of the anchor plate in the direction of closing of the control valve element, the anchor plate strikes against the sliding piece situated in a stationary mount in the housing part. Any residual pulse is transferred to the stationary sliding piece and from there to the housing part.

SUMMARY OF THE INVENTION

The solenoid valve according to an exemplary embodiment of the present invention may be situated on a slidingly displaceable part on the foundation bolt, the part being displaceable between two stops, both of which may be fixedly situated on the foundation bolt. On impact of the control valve element with the valve seat, the slidingly displaceable part may move in the direction of closing of the control valve element against the tension force of the restoring spring, like the anchor plate in the case of the solenoid valve from the related art. The mass of the slidingly displaceable part and the tension force of the restoring spring may be designed so that the slidingly displaceable part may strike against the second stop of the foundation bolt. Since this second stop is not fixedly mounted on the housing, but instead may be movable with the armature and may be secured on it, rebound of the armature from the valve seat may be reduced by the transfer of momentum of the slidingly displaceable part to the foundation bolt. This may be possible because the momentum of the armature rebounding on the valve seat and the momentum of the lagging, displaceable part on the foundation bolt may be directed in opposing directions. The present invention may also be used to advantage with such solenoid valves in which the anchor plate may be designed in one piece with the foundation bolt, thus preventing post-pulse oscillation of the anchor plate. By reducing the rebound and post-pulse oscillation of the control valve element on the valve seat, it may advantageously be possible to set shorter intervals between preinjection and the main injection, because the armature may take less time to assume a defined rest position.

The second stop formed on the foundation bolt may be formed to advantage by a ring surface, facing the slidingly displaceable part, of a hollow cylindrical sleeve fixedly connected to and displaced on the foundation bolt. In assembly, the displaceable part may be pushed onto the foundation bolt first and then the sleeve may be pushed onto it.

The first stop opposite the second stop for the displaceable part may be formed in a simple manner by a ring shoulder on the foundation bolt between the anchor plate and the second stop.

The slidingly displaceable part may advantageously include a sleeve-shaped base body pushed onto the foundation bolt and having on its end facing the first stop a flange on which the restoring spring is supported.

The mass of the slidingly displaceable part may correspond approximately to the mass of the armature formed by the anchor plate and the foundation bolt and this may result in the momentum of the displaceable part being approximately the same as that of the armature rebounding on the valve seat.

The present invention may be applied with solenoid valves using a one-part armature having an anchor plate secured on the foundation bolt or using a two-part armature having an anchor plate displaceable relative to the foundation bolt. In the latter case, the anchor plate may then be provided as the slidingly displaceable part which strikes against the second stop of the foundation bolt in the closed position of the solenoid valve.

DETAILED DESCRIPTION

Figure 1:
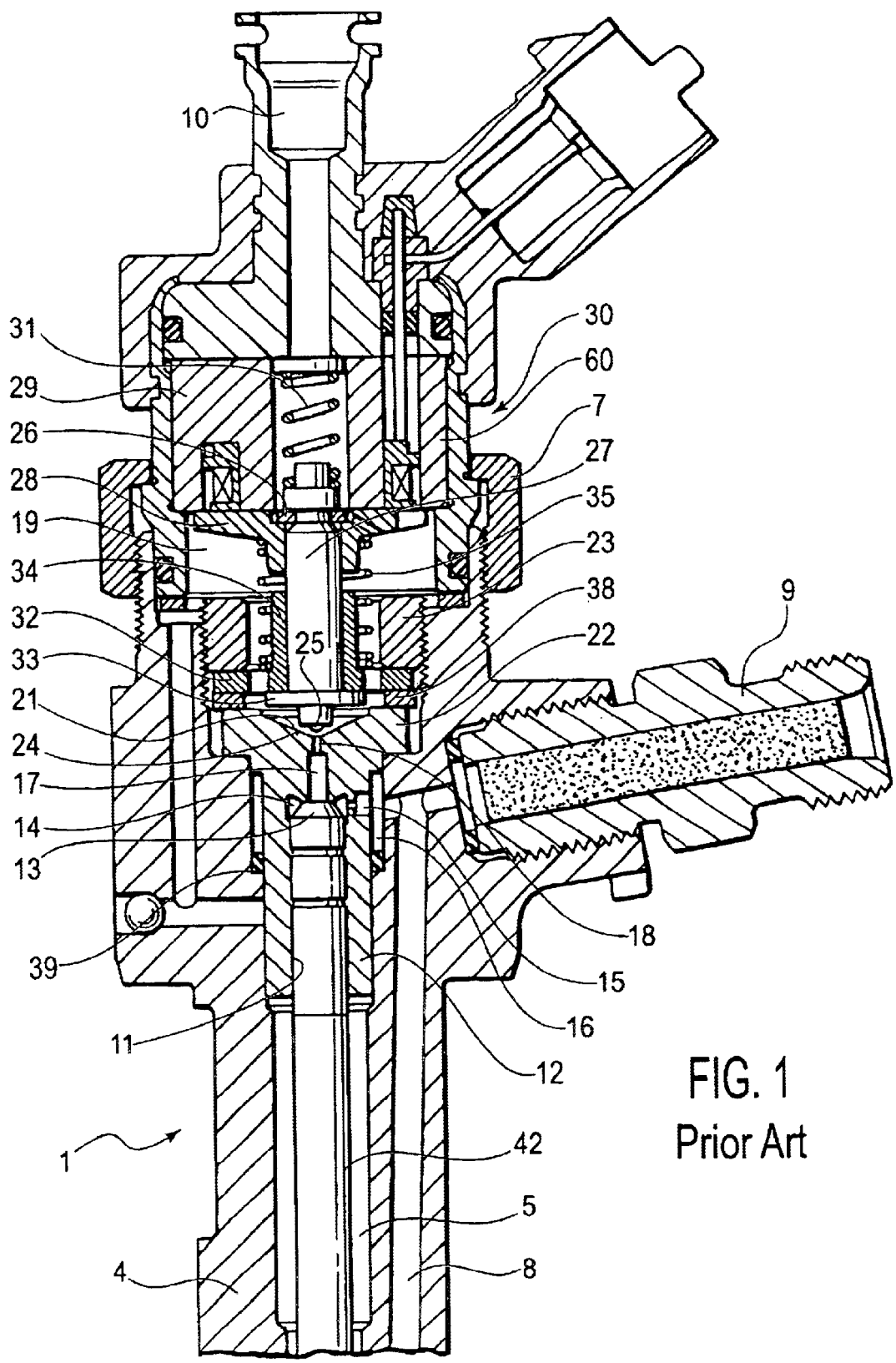
FIG. 1 shows a cross section through the top part of a fuel injector and having a solenoid valve.

FIG. 1 shows the top part of a fuel injector 1 intended for use in a fuel injection system equipped with a high-pressure fuel reservoir which may be supplied continuously with high-pressure fuel through a high-pressure delivery pump. Fuel injector 1 may have a valve housing 4 having a longitudinal bore 5 in which may be situated a valve piston 6 which works with its one end on a valve needle 42 situated in a nozzle body. The valve needle 42 may be situated in a pressure space which may be supplied with fuel under high pressure through a pressure bore 8. In an opening lifting movement of valve piston 6, the valve needle 42 may be lifted against the closing force of a spring by the high-pressure fuel acting constantly on a pressure shoulder of the valve needle 42 in the pressure space. Then the fuel may be injected into the combustion chamber of the engine through an injection opening connected to the pressure space. By lowering valve piston 6, the valve needle 42 may be pushed in the closing direction into the valve seat of the fuel injector, and the injection operation may be concluded.

As shown in FIG. 1, on its end facing away from the valve needle 42, valve piston 6 may be guided in a cylinder bore 11 which may be provided in a valve piece 12 which may be inserted into valve housing 4. In cylinder bore 11, end face 13 of valve piston 6 may close a control pressure space 14 which may be connected by an inlet channel to a high-pressure fuel connection. The inlet channel may be designed in essentially three parts. A bore passing radially through the wall of valve piece 12, its inside walls forming an inlet throttle on a portion of their length, may be constantly connected to an annular space 16 surrounding the valve piece, this annular space may in turn be constantly connected, through a fuel filter inserted into the inlet channel, to the high-pressure fuel connection of a connector 9 that may be screwed into valve housing 4. Annular space may be sealed by a ring gasket 39 with respect to longitudinal bore 5. Control pressure space 14 may be exposed to the high fuel pressure prevailing in the high-pressure fuel reservoir via inlet throttle 15. Coaxially with valve piston 6, a bore running in valve piece 12 may branch off out of control pressure space 14, forming a fuel outflow channel 17 which may be provided with an outflow throttle 18 and may open into a relief space 19, which may be connected to a low-pressure fuel connection 10, which in turn may be connected to a fuel return of injector 1. The outlet of fuel outflow channel 17 out of valve piece 12 may be in the area of a conically countersunk part 21 of the exterior end face of valve piece 12. Valve piece 12 may be fixedly braced via a screw element 23 with valve housing 4 in a flange area 22.

A valve seat 24 with which a control valve element 25 of a solenoid valve 30 controlling the fuel injector cooperates may be provided in conical part 21. Control valve element 25 may be linked to a two-part armature in the form of a foundation bolt 27 and an anchor plate 28, the armature cooperating with an electromagnet 29 of solenoid valve 30. Solenoid valve 30 may also include a housing part 60 which may hold the electromagnet and may be fixedly connected to valve housing 4 via screwable connecting means 7. With the solenoid valve, anchor plate 28 may be mounted so that it may be dynamically displaceable on foundation bolt 27 under the influence of its inertia against the prestressing force of a restoring spring 35, and it may be pressed by this restoring spring in the rest state against a stop ring 26 secured on the foundation bolt. At its other end, restoring spring 35 may be supported fixedly on the housing on a flange 32 of a sliding piece 34 guiding foundation bolt 27, the sliding piece 34 may be fixedly clamped with this flange between a spacer disk 38 placed on valve piece 12 and screw element 23 in the valve housing. Foundation bolt 27, and with it armature disk 28 and control valve element 25 which may be connected to the foundation bolt, may be constantly acted upon in the closing direction by a closing spring 31 supported fixedly on the housing, so that control valve element 25 may normally be in contact with valve seat 24 in the closed position. On energization of the electromagnet, anchor plate 28 may be pulled by the electromagnet, and in doing so, outflow channel 17 may be opened toward relief space 19. Between control valve element 25 and anchor plate 28 there may be a ring shoulder 33 on foundation bolt 27, this ring shoulder may stop on flange 32 when the electromagnet is energized and thus may limit the opening lift of control valve element 25. Spacer disk 38 may be used to adjust the opening lift between flange 32 and valve piece 12.

The opening and closing of the injector may be controlled by the solenoid valve. Foundation bolt 27 may be acted upon constantly by closing spring 31 in the closing direction, so that control valve element 25 may be in contact with valve seat 24 in the closed position and control pressure space 14 may be closed toward relief space 19, so that a high pressure may very rapidly be built up there through the inlet channel and may also be applied in the high-pressure fuel reservoir. Over the area of end face 13, the pressure in control pressure space 14 may generate a closing force on valve piston 6 and the valve needle 42 which may be connected to it, this closing force may be greater than the forces acting in the opening direction as a result of the applied high pressure. If control pressure space 14 is opened by opening the solenoid valve toward relief side 19, the pressure in the small volume of control pressure space 14 may drop very rapidly, because the latter may be uncoupled from the high pressure side via inlet throttle 15. Consequently, the force acting on the valve needle 42 in the opening direction from the fuel high pressure prevailing at the valve needle 42 may be predominant, so that it may move upward and the at least one injection opening may be opened for the injection. However, if solenoid valve 30 closes fuel outflow channel 17, the pressure in control pressure space 14 may be built up again by additional fuel flowing through inlet throttle 15, so that the original closing force may be applied and the valve needle 42 of the fuel injector may close.

In closing the solenoid valve, closing spring 31 may press foundation bolt 27 with control valve element 25 suddenly against valve seat 24. Rebound or post-pulse oscillation of the control valve element, which would have a negative effect, may occur due to the fact that the impact of the foundation bolt on the valve seat may produce an elastic deformation of the same. This elastic deformation may act as an energy storage mechanism, a portion of the energy in turn being transferred to the control valve element, which may then rebound away from valve seat 24 together with the foundation bolt. The known solenoid valve, which is shown in FIG. 1, therefore may use a two-part armature having an anchor plate 28 uncoupled from foundation bolt 27. Although in this way it may be possible to reduce the total mass striking the valve seat, a post-pulse oscillation of the anchor plate, which would be a disadvantage, may need to be reduced by a hydraulic damping device between anchor plate 28 and sliding piece 34.

Figure 2:
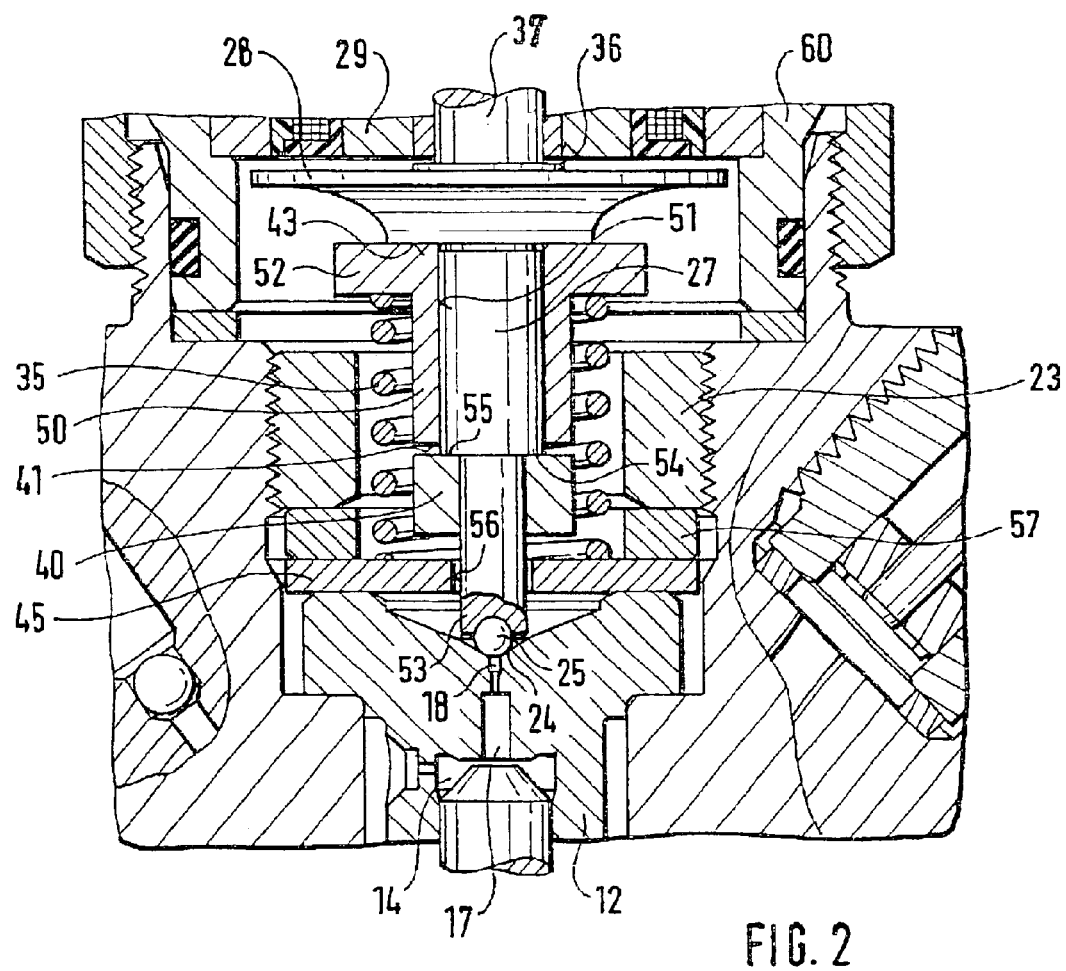
FIG. 2 shows a partial cross section through an exemplary embodiment of the solenoid valve according to the present invention having an electromagnet, an armature, a control valve element and a valve seat.

FIG. 2 shows an exemplary embodiment of the solenoid valve according to the present invention. The same parts are labeled with the same reference numbers. The solenoid valve illustrated in FIG. 2 may have a one-part armature in which anchor plate 28 may be designed in one piece with foundation bolt 27. A guide journal 37 which may project away from anchor plate 28 may be slidingly displaceable in a recess in electromagnet 29. A projection 36 on the anchor plate may guarantee a minimum distance between the electromagnet and anchor plate 28 on contacting electromagnet 29. Furthermore, an additional part 50 may be provided, including a sleeve-shaped base body made of metal on whose one end a flange 52 may be formed. Part 50 may be situated in a slidingly displaceable manner on foundation bolt 27 of the armature, the movement of slidingly displaceable part 50 on foundation bolt 27 being limited by a first stop 43 and a second stop 41. The inside diameter of an opening 51 formed in the slidingly displaceable part may be slightly larger than the outside diameter of middle section 55 of foundation bolt 27. First stop 43 may be formed by a ring shoulder or step of foundation bolt 27. Second stop 41 may be formed by a ring-shaped surface piece of a hollow cylindrical metal sleeve 40 pushed onto the foundation bolt. End section 53 of foundation bolt 27 facing valve seat 24 may have a smaller diameter than center section 55 of foundation bolt 27 carrying slidingly displaceable part 50, so that the two sections form one step 54. In the manufacture of the armature, first slidingly displaceable part 50 may be pushed onto center section 55 of the foundation bolt and then sleeve 40 may be pushed onto end section 53. When sleeve 40 is pushed onto the foundation bolt, the sleeve may come to rest against step 54 and may be secured in this position on the foundation bolt, which may be accomplished by welding, caulking or some other suitable method. As also shown in FIG. 2, a guide disk 45 having an opening 56 may be also provided. Guide disk 45 and a spacer 57 are clamped between a screw element 23 and valve piece 12 in the valve housing. End section 53 of foundation bolt 27 may be provided with control valve element 25 and may be slidingly displaceably mounted in opening 56 in guide disk 45. A restoring spring 35 may be supported at one end on flange 52 of slidingly displaceable part 50 and at its other end it may be supported on guide disk 45 fixedly on the housing.

In a position in which the armature may be in contact with electromagnet 29, restoring spring 35 may press slidingly displaceable part 50 with flange 52 against first stop 43. When the electromagnet is shut down, the armature together with the anchor plate and the foundation bolt may be accelerated by closing spring 31 toward valve seat 24. The greater tension force of closing spring 31 may counteract the smaller tension force of restoring spring 35. As soon as control valve element 25 strikes the valve seat, slidingly displaceable part 50 may move in the closing direction because of its inertial mass, so the additional mass of part 50 may not increase the total mass to be decelerated by the valve seat. Slidingly displaceable part 50 may move on foundation bolt 27 against the tension force of restoring spring 35. Shortly after the moment when foundation bolt 27 strikes valve seat 24, lagging, slidingly displaceable part 50 may strike stop 41 of foundation bolt 27. In doing so, the momentum of slidingly displaceable part 50 may be transferred to the foundation bolt, so that the momentum of the rebounding armature directed in the opposite direction may be reduced by the transfer of momentum. The mass of the slidingly displaceable part may be advantageously designed so that the absolute value of both momentums is the same. Slidingly displaceable part 50 may make it possible to achieve the result that the rebounding movement of the armature may be prevented or at least diminished, and the solenoid valve may be closed more reliably. Part 50 may thus actively counteract rebound and/or post-pulse oscillation of the armature. This may shorten the time required to move control valve element 25 into a defined rest position, thus permitting a smaller interval between preinjection and main injection. Then slidingly displaceable part 50 may be pushed back by restoring spring 35 into its starting position at first stop 43.

In deviation from the exemplary embodiment illustrated here, the armature may also be designed in two parts, having an anchor plate slidingly displaceably mounted on the foundation bolt. In this case, the anchor plate may be regarded as the slidingly displaceable part which transfers its kinetic energy to the foundation bolt through its impact on the second stop of the foundation bolt and thus may actively prevent rebound of the armature.

What is claimed is:

1. A solenoid valve for controlling a fuel injector of an internal combustion engine, comprising:

a housing part;

an electromagnet;

a movable armature including an anchor plate and a foundation bolt;

a closing spring;

a restoring spring;

a control valve element moveable with the movable armature, the closing spring acting upon the control valve element in a closing direction of the control valve element, the control valve element operable in cooperation with a valve seat to open and close a fuel outflow channel of a control pressure space of the fuel injector; and a slidingly displaceable part slidingly displaceable on the foundation bolt in the closing direction under an influence of an inertial mass of the slidingly displaceable part against a tension force of the restoring spring, a first end of the restoring spring being situated in a stationary mount on the housing part, a second end of the restoring spring pressing the slidingly displaceable part against a first stop secured on the foundation bolt against the closing direction, a second stop being situated on the foundation bolt;

wherein, when the control valve element strikes against the valve seat when the solenoid valve is closed, a displacement of the slidingly displaceable part on the foundation bolt resulting from the inertial mass and directed against the tension force of the restoring spring causes the slidingly displaceable part to abut against the second stop of the foundation bolt thereby preventing at least one of a post-pulse oscillation and a rebound of the control valve element from the valve seat.

2. The solenoid valve according to claim 1, further comprising:

a hollow cylindrical sleeve, wherein the second stop is formed by a ring-shaped surface of the hollow cylindrical sleeve fixedly connected to the foundation bolt, the ring-shaped surface facing the slidingly displaceable part.

3. The solenoid valve according to claim 1, wherein the first stop is formed by a ring shoulder formed on the foundation bolt between the anchor plate and the second stop.

4. The solenoid valve according to claim 1, wherein the slidingly displaceable part includes a sleeve-shaped base body connected to the foundation bolt, the sleeve-shaped base body including a flange on an end facing the first stop, the flange supporting the restoring spring.

5. The solenoid valve according to claim 1, wherein a mass of the slidingly displaceable part corresponds approximately to a mass of the movable armature.

6. The solenoid valve according to claim 1, wherein the foundation bolt is designed with the anchor plate as one piece.

* * * * *